United States Patent
Williams et al.

(10) Patent No.: US 6,724,876 B2
(45) Date of Patent: Apr. 20, 2004

(54) METHOD AND APPARATUS FOR EFFECTING TELECOMMUNICATIONS SERVICE FEATURES USING CALL CONTROL INFORMATION EXTRACTED FROM A BEARER CHANNEL IN A TELECOMMUNICATIONS NETWORK

(75) Inventors: L. Lloyd Williams, Kanata (CA); Alexander Markman, Thornhill (CA); David Edward Johnston, Whitby (CA)

(73) Assignee: RevD Networks, Inc., Ottawa (CA)

( * ) Notice: Subject to any disclaimer, the term of this patent is extended or adjusted under 35 U.S.C. 154(b) by 353 days.

(21) Appl. No.: 09/798,085

(22) Filed: Mar. 2, 2001

(65) Prior Publication Data
US 2002/0122544 A1 Sep. 5, 2002

(51) Int. Cl.$^7$ .................... H04J 3/14; H04L 12/16; H04M 3/22; H04M 3/42; H04Q 11/00
(52) U.S. Cl. .................. 379/207.02; 370/259; 370/384; 370/522; 370/904; 379/32.02; 379/201.12; 379/221.08; 379/221.15; 379/901
(58) Field of Search ................. 370/351, 352, 370/381, 382, 383, 384, 385, 401, 522, 259, 904; 379/32.01, 32.03, 201.01, 201.05, 201.12, 212.01, 219, 220.01, 221.08, 230, 32.02, 207.02, 221.15, 901

(56) References Cited

U.S. PATENT DOCUMENTS

| | | | |
|---|---|---|---|
| 5,881,132 A | 3/1999 | O'Brien et al. | 379/35 |
| 6,097,804 A | 8/2000 | Gilbert et al. | 379/230 |
| 6,111,946 A | 8/2000 | O'Brien | 379/230 |
| 6,226,289 B1 * | 5/2001 | Williams et al. | 370/385 |

FOREIGN PATENT DOCUMENTS

| WO | 9916256 | 4/1999 | H04Q/3/00 |
|---|---|---|---|
| WO | 9934613 | 7/1999 | H04Q/3/00 |

OTHER PUBLICATIONS

International Search Report mailed Jul. 12, 2002, for PCT Application No. PCT/CA02/00277 which corresponds with the present application.

* cited by examiner

*Primary Examiner*—Harry S. Hong
(74) *Attorney, Agent, or Firm*—Van Dyke, Gardner, Linn & Burkhart, LLP

(57) ABSTRACT

A system and method provide a call service features in response to call control information conveyed by a monitored bearer channel in a telecommunications network. A bearer channel monitor captures the call control information and relays the information to a call control application server. The call control application server analyzes the call control information, and provides call control instructions to a call control node that operates in the telecommunications network to effect the call service. The call control node serves as one or more virtual switching points in the network to directly control call routing without disconnecting a called or calling party, unless required as part of a service feature. Control from a center of the telecommunications network provides rapid and efficient call control without use of edge devices or duplication of bearer channels in the network.

30 Claims, 8 Drawing Sheets

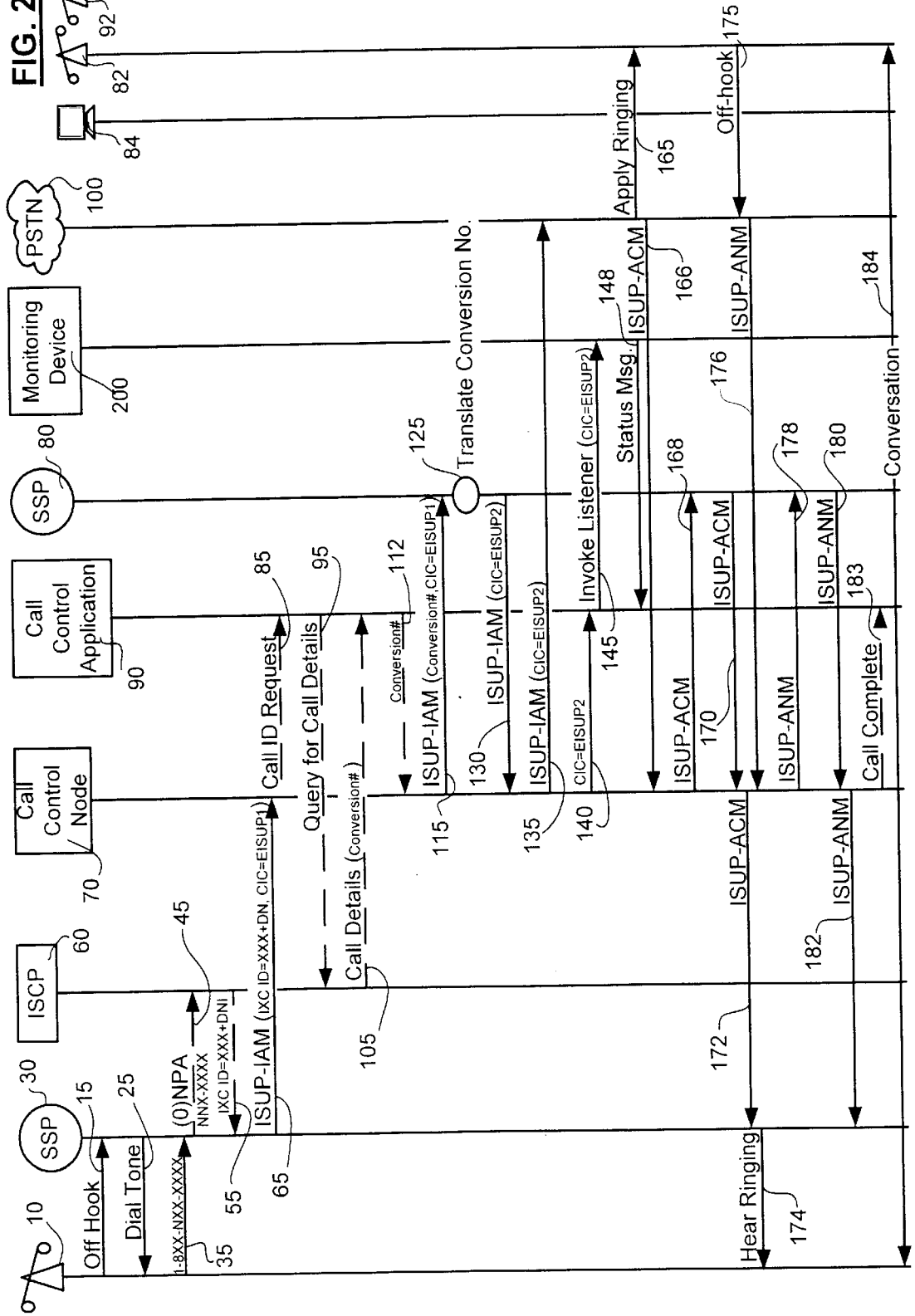

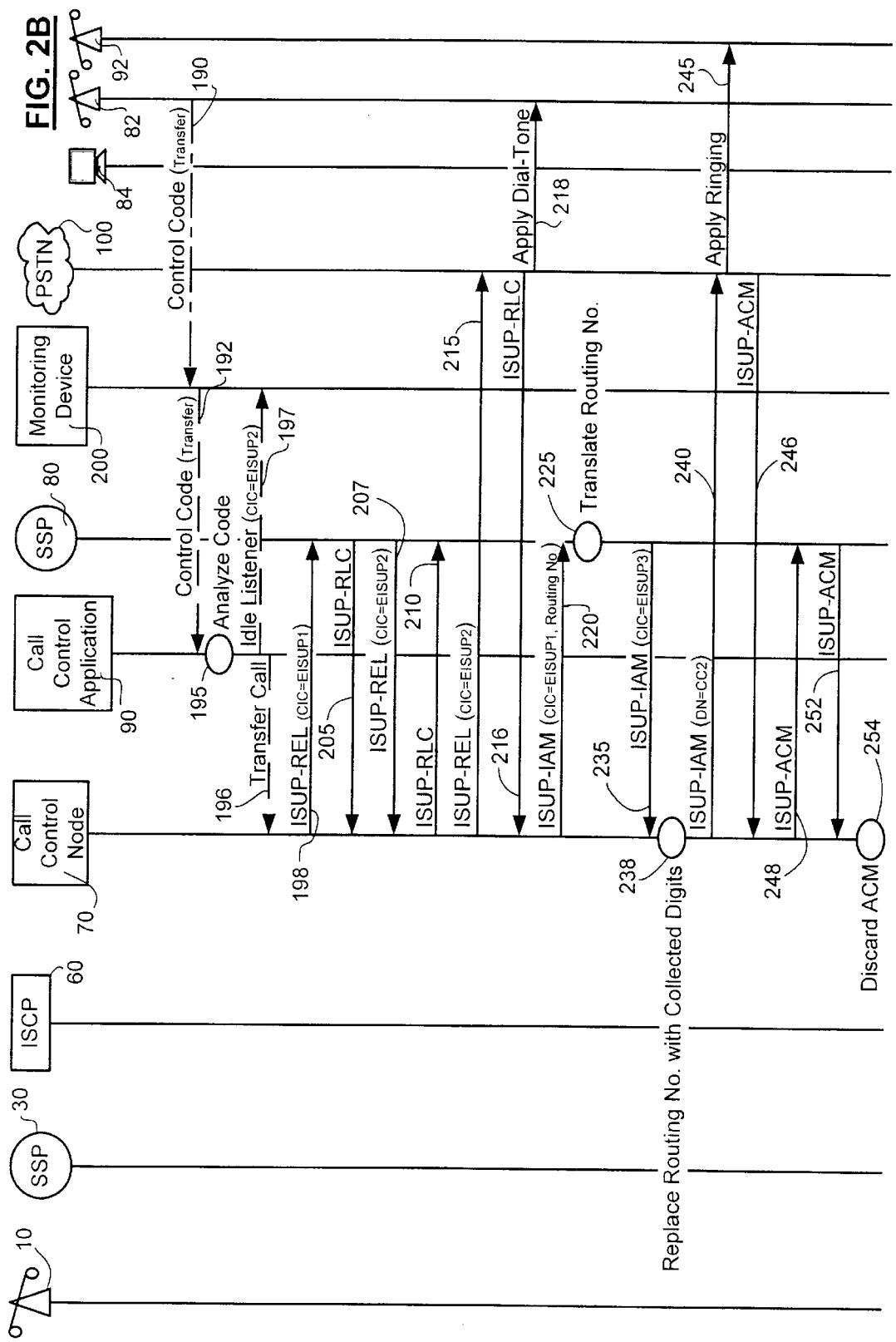

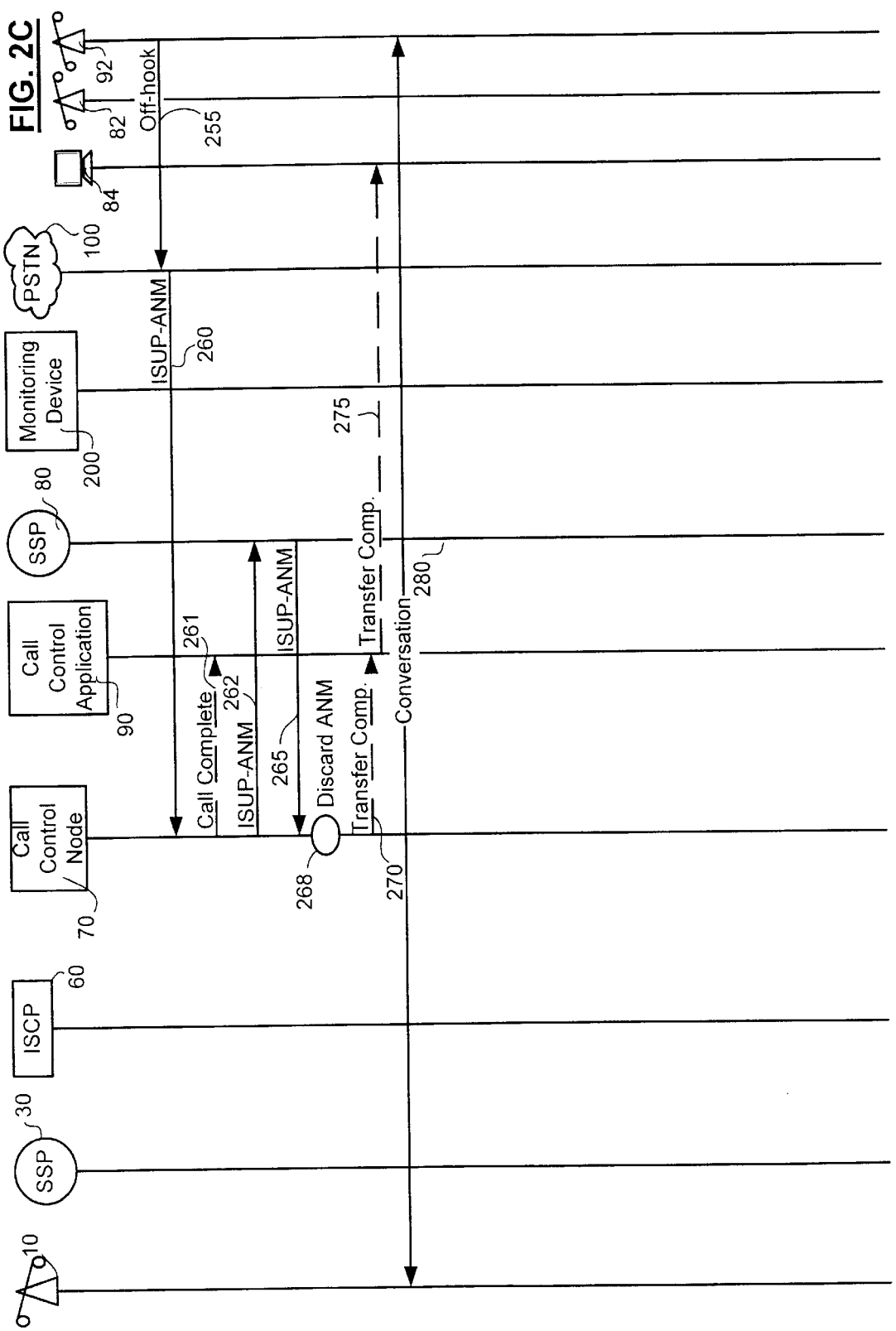

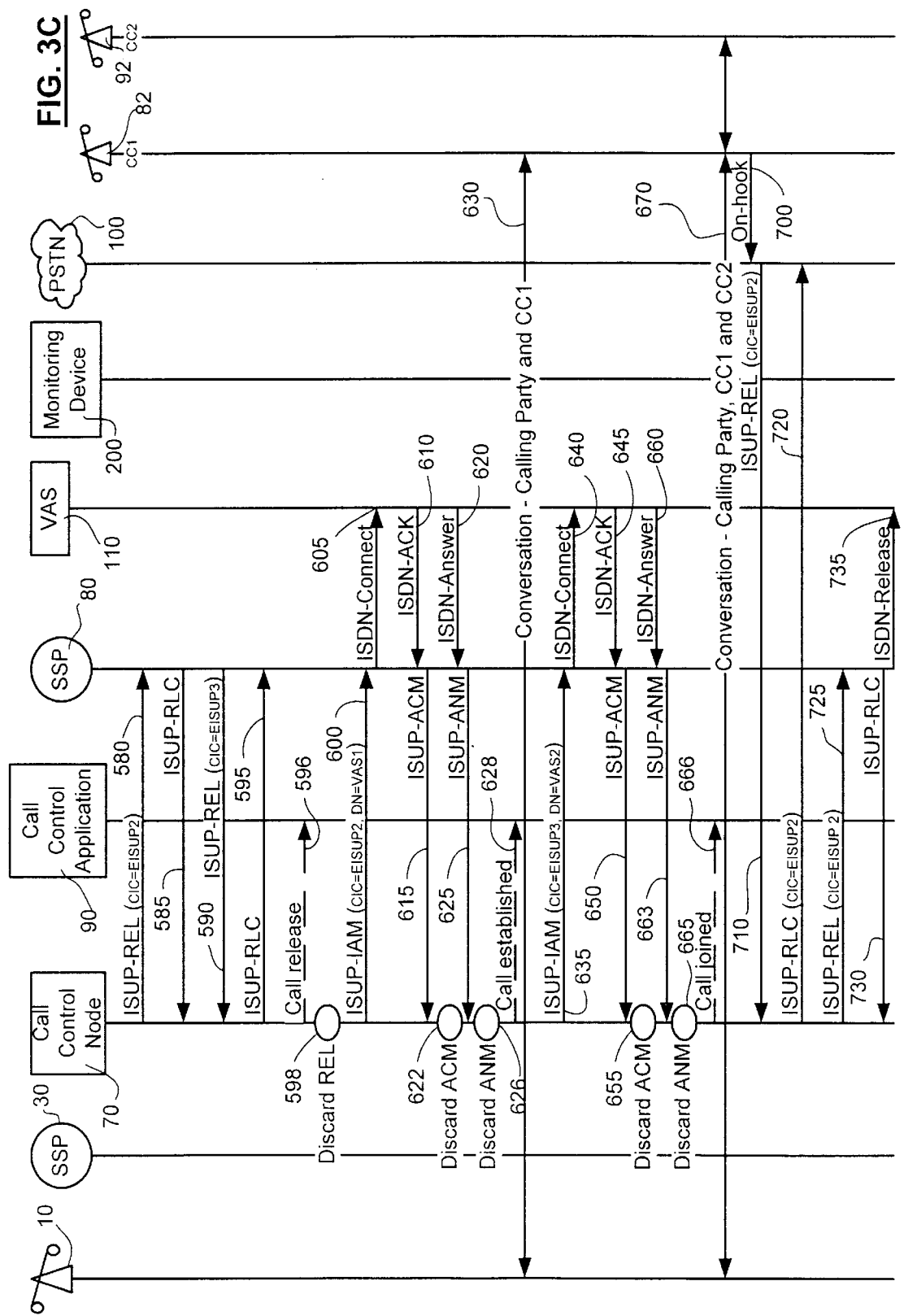

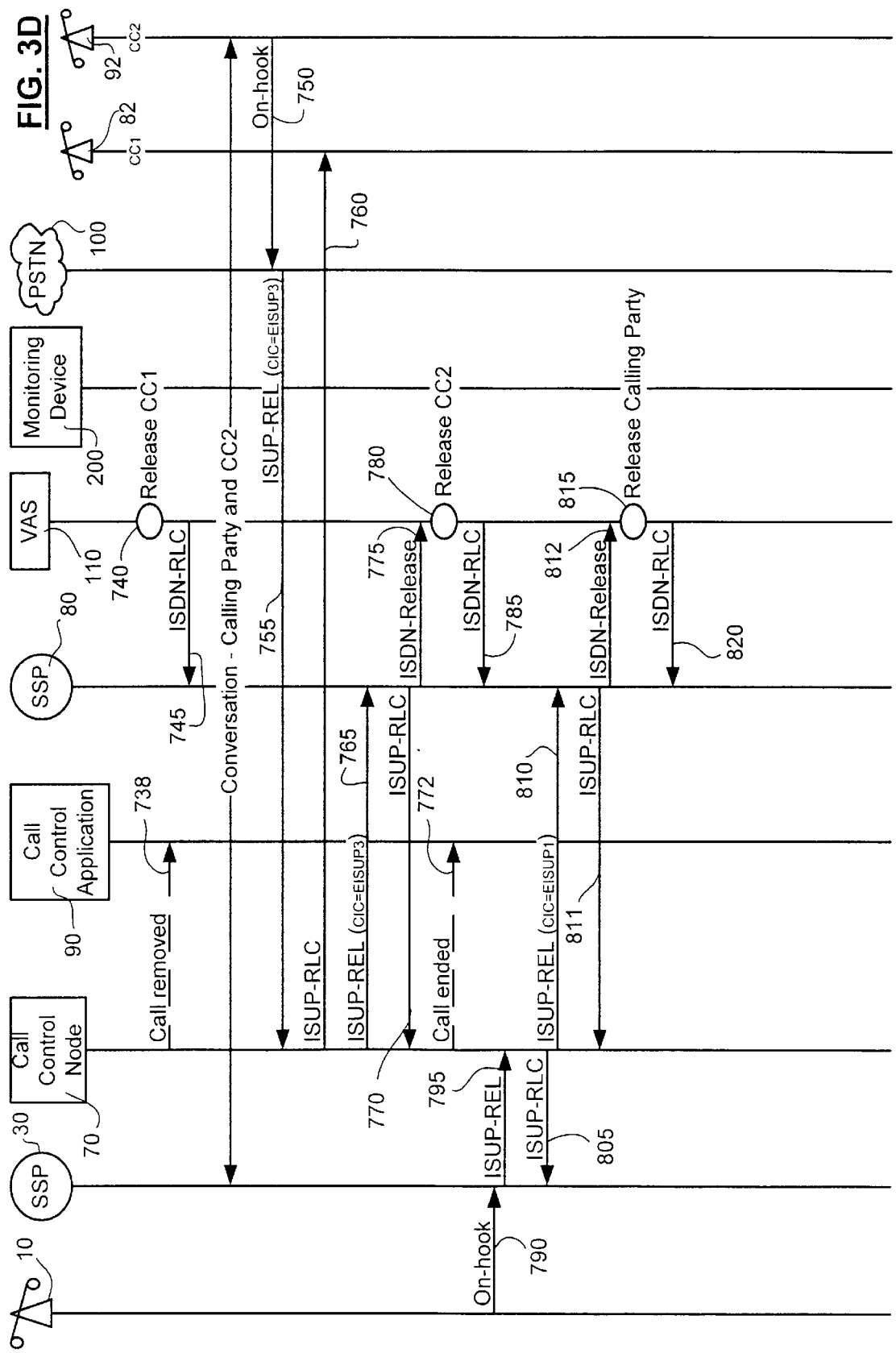

METHOD AND APPARATUS FOR EFFECTING TELECOMMUNICATIONS SERVICE FEATURES USING CALL CONTROL INFORMATION EXTRACTED FROM A BEARER CHANNEL IN A TELECOMMUNICATIONS NETWORK

CROSS-REFERENCE TO RELATED APPLICATIONS

This is the first application filed for the present invention.

MICROFICHE APPENDIX

Not Applicable.

TECHNICAL FIELD

The present invention relates to the field of call control in a telecommunications network. In particular, the invention relates to a method and apparatus for effecting call service features in response to call control information extracted from a bearer channel of a telecommunications network.

BACKGROUND OF THE INVENTION

The growing use of telecommunications services has prompted demand for ways to more efficiently control bearer connections through telecommunications networks. Control functions have been implemented in telecommunications networks to improve the efficiency of telecommunications service delivery and the quality of services. Although facilities are available for managing call progress, existing facilities generally manage calls from edge equipment in a telecommunications network. Such facilities are known to consume network resources and reduce the overall speed and efficiency of call progress through the network.

For example, interactive voice response (IVR) units, private branch exchanges (PBXs) and automatic call distributors (ACDs) are widely used as edge equipment for call feature implementation. Such equipment may use voice prompts to collect call control information for processing or routing calls within the telecommunications network. A calling party using an IVR, PBX or ACD selects a desired feature from a menu of feature options presented, in order to further the progress of the call. However, such devices are not adapted to perform complex functions, such as conference calling, peer consulting or call transfer without duplication of bearer channel paths through the network. Accordingly, although existing IVR, PBX and ACD facilities provide communication systems with edge management capability, they fail to provide call control capability without unduly consuming capacity in a telecommunications network.

Systems and methods for monitoring call connections are also known. Specifically, known call monitoring enables a third party to monitor a call for the purpose of ensuring quality control, or the like. Typically, such monitoring systems require the functionality of an Advanced Intelligent Network (AIN) in conjunction with service switching points (SSPs) of a public switched telephone network (PSTN). The SSPs are generate triggers in response to calls made to a designated subscriber line, for example. When an SSP generates a call monitor trigger in response to a call, the call connection is completed and a bridge to the monitoring equipment is established.

U.S. Pat. No. 5,881,132 to O'Brien et al. teaches a method and apparatus for monitoring selected telecommunications sessions in an intelligent switched telephone network. The call monitoring is accomplished using trunk monitoring equipment provided on a serving switch within an intelligent network. The method and apparatus for monitoring a call in accordance with this patent provide the ability to unobtrusively listen to or record communications routed through monitored trunks.

U.S. Pat. No. 6,111,946, which issued to O'Brien on Aug. 29, 2000, is entitled METHOD AND SYSTEM FOR PROVIDING ANSWER SUPERVISION IN A TELECOMMUNICATIONS NETWORK and is directed to monitoring trunks to determine if a call has been answered, but an Answer message has not been generated by terminating equipment. Trunk monitoring equipment is activated by an Answer Supervisor Analyzer in response to a call for which a call Answer message is wanting, billing records may not have been generated, and a conversation may be in progress. The trunk monitoring equipment is adapted to test the trunk for bearer traffic to determine if a call is in progress.

However, the prior art fails to teach apparatus for extracting call control information from a bearer channel in a telecommunications network. In addition, existing systems fail to provide telephone service subscribers with the ability to control a call in progress with another party using service control information input directly through the bearer channel.

There therefore remains a need for a method and apparatus that are adapted to extract call control information from a bearer channel in the network, and process that information to dynamically effect call service features from a center of the network, without the use of edge equipment.

SUMMARY OF THE INVENTION

It is therefore an object of the invention to provide a system and method for providing call service features to a telephone service subscriber that is a party to a call, using information extracted from the subscriber's bearer channel.

It is another object of the invention to provide a call control application server adapted to effect control over a bearer channel in a telecommunications network from a center of the network without the use of edge equipment.

The invention therefore provides a system for effecting service features in a telecommunications network, comprising a bearer channel monitor adapted to capture service control information sent through a bearer channel in the telecommunications network by a party to a telecommunications session set up using the bearer channel; and a call control application server for receiving the service control information and effecting service features in response the service control information.

A call control node receives instructions from the call control application server, and sets up or tears down connections through the telecommunications network in response to the instructions. The call control node is a virtual switching point in the telecommunications network, and a physical node in a signaling plane of the telecommunications network. The telecommunications network may be a switched telephone network, in which case the virtual switching point is a virtual service switching point in the switched telephone network. The virtual switching point is provisioned with a plurality of virtual trunk groups corresponding to a plurality of real trunk groups in the switched telephone network, and serves as a virtual switching point between terminating ends of each plurality of the physical trunk groups. Alternatively, the virtual switching point may be provisioned with a plurality of point codes, each of the respective point codes being associated with a one of the respective physical trunk groups. A plurality of service switching points are connected to opposite ends of the respective trunk groups, and at least certain ones of the service switching points are provisioned to route calls to the trunk groups when the calls are associated with a predetermined routing code. The service switching points are further provisioned with routesets and linksets that direct common channel signaling messages associated with the calls to a point code of the call control node.

An intelligent peripheral may be used by the call control application server to effect certain ones of the service features. If so, the intelligent peripheral may be adapted to perform the functions of an interactive voice response unit (IVR). The intelligent peripheral may also be adapted to perform the functions of a conference bridge.

The system in accordance with the invention preferably also includes a service control point (SCP) for providing dialed number translations to the call control application server. The SCP may be an intelligent service control point (ISCP), and the call control application server may query the ISCP using messages sent through a data network other than the common channel signaling (CCS) network. The bearer channel monitor and the call control application server are also preferably connected to the data network to permit an exchange of control commands and service control information between the bearer channel monitor and the call control application server.

The invention further provides a method of enabling the provision of dynamic service features in a switched telecommunications network. The method comprises steps of: monitoring a bearer channel of a selected communications session set up through the switched telecommunications network, to capture service control information input by a party to the telecommunications session; analyzing the captured service control information to determine a service feature requested by the party to the telecommunications session; and controlling switching equipment in the switched telecommunications network to effect the service feature.

The step of monitoring the bearer channel may comprise capturing selected content on the bearer channel and transferring the selected content to the call control application server. The step of analyzing the captured content comprises a step of analyzing the content at the call control application server to determine whether service control information has been captured. The analyzing may be performed by parsing the content to detect discrete tone signals generated by the party using a telephone keypad. The analyzing may likewise be performed by parsing the content using a speech recognition algorithm to detect commands spoken by the party.

The step of controlling switching equipment in the switched telephone network comprises steps of: sending instructions from the call control application server to a call control node that is a physical node in a signaling plane of the switched telecommunications network, and a virtual node in a switching plane of the switched telecommunications network; and executing the instructions at the call control node to effect the service feature.

The switched telecommunications network may be a switched telephone network. In that case, the step of executing the instructions comprises steps of: sending a Release message forward through the switched telephone network from a first instance of the call control node, and discarding the Release message at a second instance of the call control node, to release a portion of a connection between a first and second party to the telecommunications session without releasing either of the first and second parties; and sending initial address messages (IAMs) from the respective first and second instances of the call control node to initiate a connection of the first and second parties to a new call termination. Subsequent common channel signaling messages related to the telecommunications session returned to the respective first and second instances of the call control node are discarded in order to avoid confusion in downstream switches.

The invention enables the provision of a plurality of service features, including: transferring one of the parties to a new termination and releasing the other party; transferring one of the parties to a predetermined termination and connecting the other party with a new termination to permit the other party to consult with a person at the new termination; and, dynamically conferencing two or more parties together. Messages are preferably sent from the call control node to the call control application server to inform the call control application server of the status of the communications session each time a service feature is effected or a communications session is terminated.

Billing records are maintained at the call control node to track usage charges for each service feature invoked during a communications session. A separate billing record is preferably produced at the call control application server for each service feature invoked during a communications session.

The switched telecommunications network is provisioned to route selected calls to bearer channels that are monitored to capture service control information. If the switched telecommunications network is a switched telephone network, the step of provisioning comprises steps of: provisioning a service control point (SCP) in the network to return a routing code in response to a common channel signaling query containing a directory number of a termination for the selected calls; and, provisioning at least one service switching point (SSP) in the network to route the selected calls to selected trunks in the switched telephone network when an initial address message (IAM) containing the routing code is received. The provisioning further comprises a step of provisioning at least one trunk in the switched telephone network so that the call control node is a virtual switching point logically positioned between terminating ends of the at least one trunk. The step of provisioning the at least one trunk comprises a step of provisioning, at SSPs connected to opposite ends of the at least one trunk, routesets and linksets associated with the at least one trunk to route Integrated Services Digital Network User Part (ISUP) common channel signaling messages associated with the selected calls to a specific instance of the call control node. The call control node is also provisioned with a plurality of virtual trunk groups, each virtual trunk group being associated with a specific instance of the call control node.

BRIEF DESCRIPTION OF THE DRAWINGS

Further features and advantages of the present invention will become apparent from the following detailed description, taken in combination with the appended drawings, in which:

FIGS. 2A, B and C are, collectively, a message flow diagram illustrating principal steps involved in establishing and transferring a communications session using the bearer channel monitoring and call control equipment shown in FIG. 1.

It should be noted that throughout the appended drawings, like features are identified by like reference numerals.

DETAILED DESCRIPTION OF THE PREFERRED EMBODIMENT

In general, the invention relates to a system for monitoring a bearer channel in a telecommunications network to extract service control information associated with a communications connection. Service control information is generated by a party to a call, and passed through the party's bearer channel. The bearer channel is monitored by monitoring equipment that is adapted to send the service control information to an application server. The application server interprets the information and effects call control in accordance with the service control information.

The invention is described below in the context of an intelligent switched telephone network schematically illustrated in FIG. 1. However, it should be understood that this invention may be deployed in many other telecommunications network configurations with analogous signaling protocols and suitably adapted analogous devices to employ the same efficient method of providing the service features.

The system of the present invention is particularly suited to providing fast, facility-usage efficient call service features to a party to an established call. For example, a party engaged in an established call may request a transfer of either party to a next call termination. In order to do so, call control information is transmitted through the bearer channel of the established call. The call control information is detected and retrieved from the bearer channel by the bearer channel monitor. The call control information is further processed to effect a designated call service feature to the parties of the established call. The facility-usage efficiency of effecting a service feature, without releasing the entire bearer channel while setting up another call, is substantial.

Figure 1:
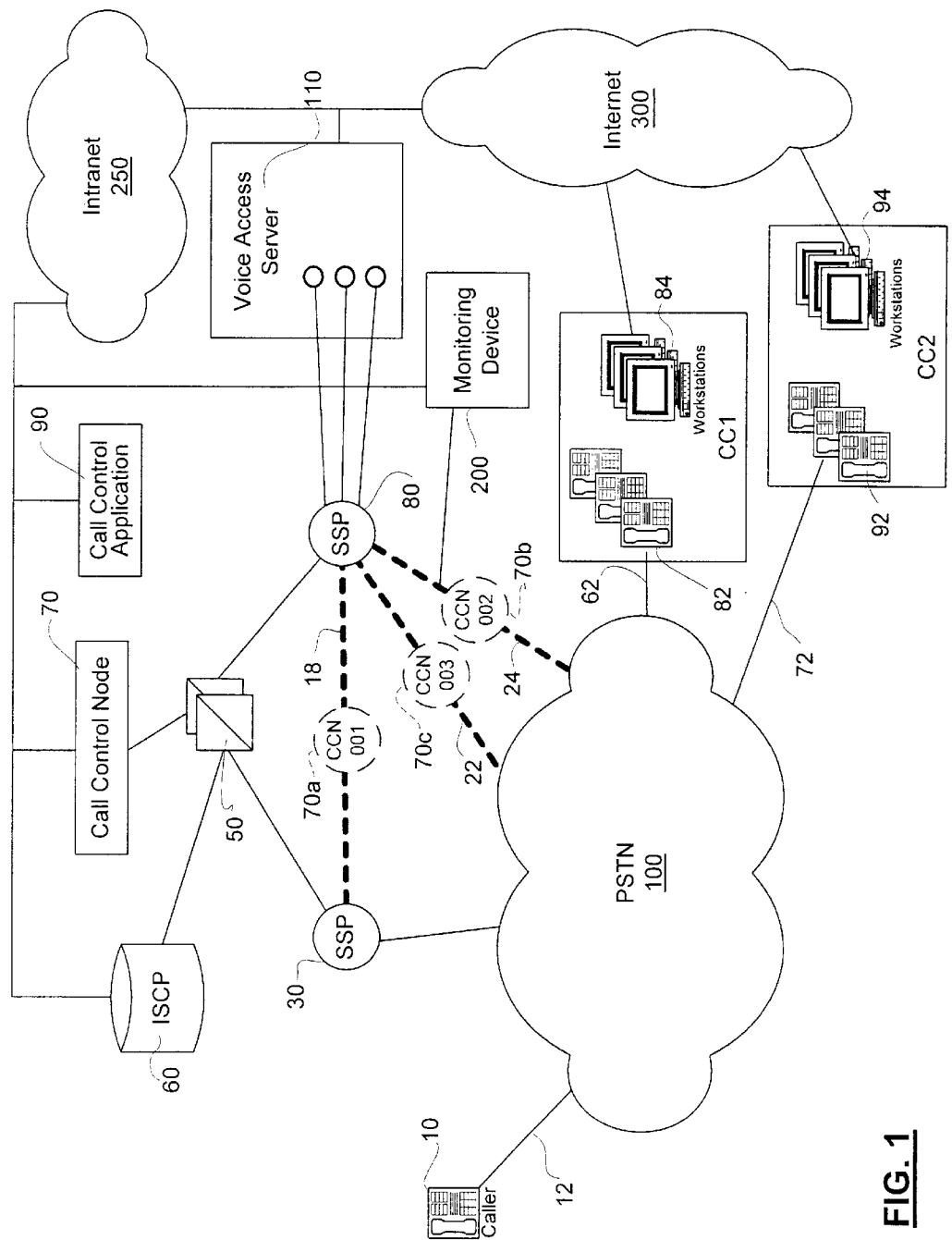
FIG. 1 is a schematic diagram of a portion of a telecommunications network configured with bearer channel monitoring and call control equipment to enable call control in accordance with an embodiment of the invention.

FIG. 1 is a schematic diagram of a portion of an intelligent switched telephone network configured with service control equipment in accordance with an embodiment of the invention. A calling party's telephone 10 is connected by a subscriber line 12 to a service switching point (SSP) (not shown) in the Public Switched Telephone Network (PSTN) 100, in a manner well known in the art. The SSP serves a plurality of subscriber lines, which include the subscriber line 12, and is connected to a plurality of trunks that connect the SSP to other SSPs in the PSTN 100. In accordance with the invention, certain ones of the SSPs in the intelligent switched telephone network are provisioned with Enhanced Integrated Services Digital Network User Part (E-ISUP) trunks 18, 22, 24. E-ISUP trunks are distinguished from regular ISUP trunks in the network by the fact that a call control node 70 is a virtual SSP (VSP) that is provisioned as a logical switching node located between terminating ends of the respective E-ISUP trunks, as explained in more detail in Applicants' copending U.S. patent application Ser. No. 08/939,909 entitled METHOD AND APPARATUS FOR DYNAMICALLY ROUTING CALLS IN AN INTELLIGENT NETWORK, which was filed on Sep. 29, 1997, and is incorporated herein by reference. Consequently, routesets and linksets at SSPs at terminating ends of the E-ISUP trunks 18, 22 and 24 are provisioned to direct ISUP call control messages to respective instances of the call control node 70. The respective instances of the call control node 70 are illustrated as virtual SSPs 70a, 70b and 70c. The physical trunk groups with which each virtual SSP is associated are provisioned as virtual trunk groups in the call control node 70. The provisioning of the virtual trunk groups permits the call control node to track the instance of the virtual SSP 70a-c involved in any given transaction.

For purposes of clarity, only two SSPs in the switched telephone network are illustrated, namely SSPs 30 and 80. For the sake of example, the switched telephone serves two call centers, CC1 and CC2. Call centers CC1 and CC2 are connected by voice trunks 62 and 72 to the PSTN 100. The voice trunks 62 and 72 connect to SSPs (not shown) within the PSTN 100.

As described above, the switched telephone network includes the CCS network (not delimited), used for exchanging control messages between switching points in the PSTN 100. In North America, the CCS network is a Signaling System 7 (SS7) network. In order to minimize the number of signaling links required to connect signaling points in the PSTN 100, the signaling network includes Signal Transfer Points (STPs) 50 which, for the purpose of reliability, are provisioned in redundant or "mated" pairs. In the simplified network configuration depicted, one mated pair of STPs 50 is illustrated. Each STP in the pair is connected by signaling links to other signaling points in the PSTN 100, in a manner well known in the art. The switched telephone network shown in FIG. 1 also includes an intelligent service control point (ISCP) 60, which is queried by SSPs and other intelligent signaling points to retrieve call routing information, as known in the art.

Figure 3A:
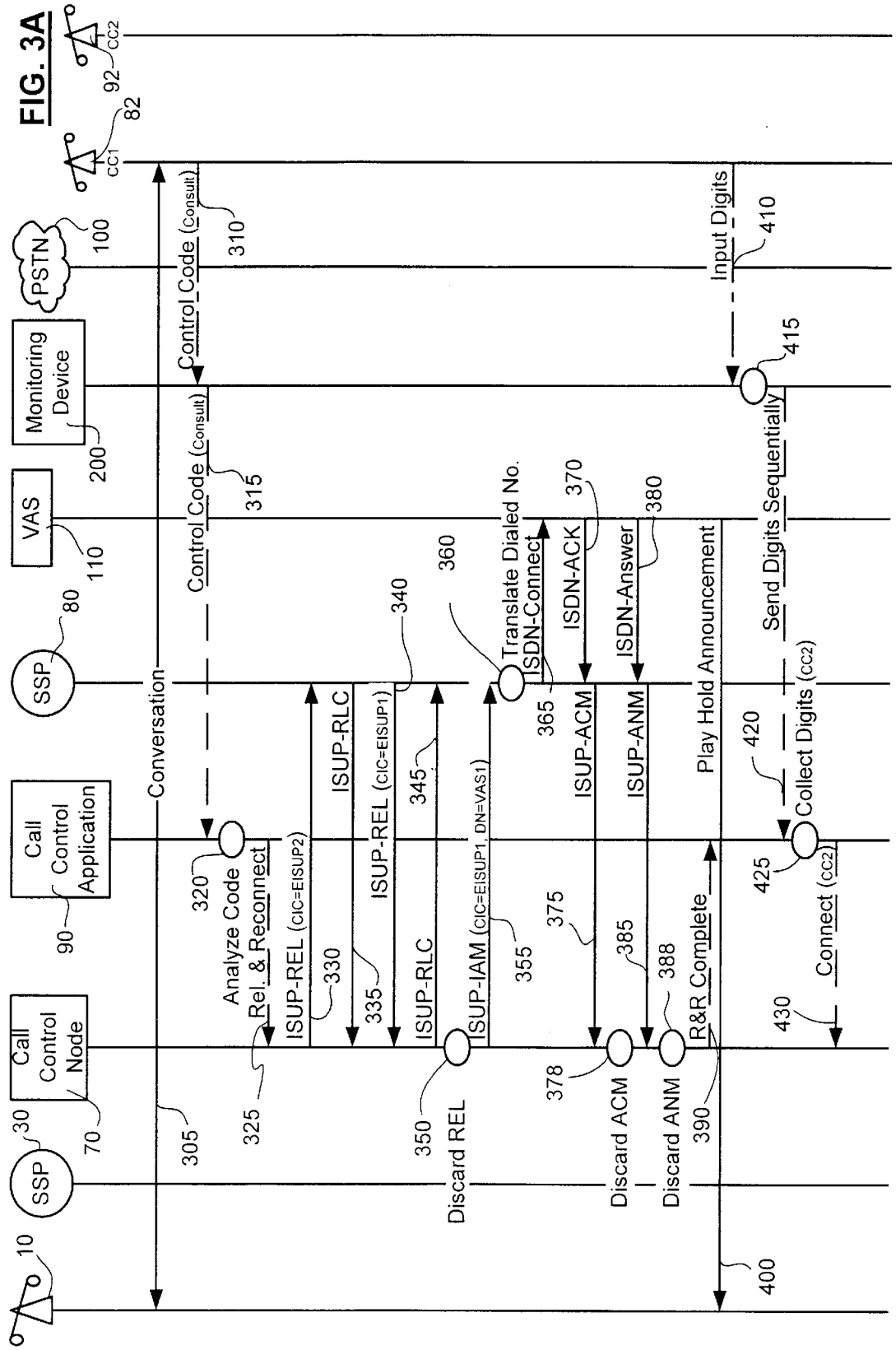
FIGS. 3A, B, C, and D are, collectively, a message flow diagram illustrating principal steps involved in providing transfer, consultation and conferencing services using the bearer channel monitoring and call control equipment shown in FIG. 1.

In accordance with the invention, a monitoring device 200, which is an example of a bearer channel monitor that is adapted for use in the PSTN, is connected to E-ISUP trunk group 24. The monitoring device 200 is adapted to extract service requests and call control information from bearer traffic carried by E-ISUP trunk 24. For the exemplary service features explained below with reference to FIGS. 2 and 3, it is preferable that a monitoring device be connected to each of the trunks 22 and 24. For simplicity, however, a single monitoring device 200 is shown.

In accordance with a preferred embodiment of the invention, the monitoring device 200 is connected to the trunk group via a monitoring interface. The monitoring device 200 is adapted to detect call control information transmitted over one or more selected trunks in a trunk group. The call control information may be, for example, dual-tone-multi-frequency (DTMF) signals, or predetermined voice commands. This information is detected by the monitoring device 200 and sent to a call control application server 90, where it is decoded or processed to extract service request commands and/or call routing information. The monitoring device 200 is preferably connected to a trunk in a manner that permits monitoring to be conducted in a single direction. The monitoring device 200 provides selective trunk monitoring services for call center 82 through E-ISUP trunk group 24. In accordance with a preferred embodiment of the present invention, the monitoring device 200 is controlled by the call control application server 90 and all call control information analysis is conducted by the call control application server 90.

The call control application server 90, generates call control messages in response to call control information extracted from a trunk in the E-ISUP trunk group 24. The call control application server 90 sends the call control messages to a call control node 70. The call control node 70 uses information in the call control messages to effect call services. The call control node 70 also communicates to the call control application server 90 information related to any new communications sessions routed through E-ISUP trunk group 24, so that the call control application server 90 can control the monitoring device 200 to monitor the bearer channel associated with the new call.

The intelligent switched telephone network also includes a voice access server (VAS) 110, connected to the SSP 80. The VAS 110 is adapted to provide conference bridging capabilities, as well as interactive voice response (IVR) capability. The call control node 70, call control application server 90, ISCP 60, and monitoring device 200, are respectively connected to a data communications network, such as an Intranet 250, and are adapted to exchange Transfer Control Protocol over Internet Protocol (TCP/IP) packets, or some equivalent messaging protocol. The Intranet 250 is also adapted to inter-work with the public Internet 300.

As explained above, the call control application server 90 is adapted to receive call control information from the monitoring device 200, and to effect a call service feature by sending control commands to the call control node 70. This enables substantially improved service feature provision. By way of example, FIGS. 2A, B and C illustrate principal messages exchanged between network elements in the provision of service features to a call center (CC1) using the network elements schematically illustrated in FIG. 1.

As shown in FIG. 2A, a call request is made from the telephone 10 by dialing a toll-free number. Initially, in step 15, telephone 10 is taken off-hook, sending an off-hook signal to an SSP that serves subscriber line 12. For the sake of simplicity of illustration, the telephone 10 is shown as being connected directly to SSP 30, though this is generally not the case. As will be understood by those skilled in the art, however, for the sake of example, the telephone 10 could be served by the SSP 30. The SSP 30 applies a dial tone (step 25) to subscriber line 12, and the digits forming the 1-8XX directory number (DN), are dialed (35). On receipt of the dialed digits, the SSP 30 translates the digits, and, as the first four digits indicate a toll-free directory number, the SSP 30 queries the ISCP 60 to obtain routing information (step 45). The query is made using a Transactions Capability Applications Part (TCAP) query message that includes the dialed 1-8XX number and one of the calling line identification (CLID), automatic number identification (ANI) and Trunk data. In response to the query, the ISCP is programmed to return an Inter-exchange Carrier Identification (IXC ID) and a dialed number indication (the 8XX DN dialed by the caller).

In a manner known in the art, the SSP 30 then creates an initial billing record, in response to the details received from the ISCP 60, selects and reserves a trunk for the call, which is controlled by the IXC ID, and formulates an ISUP Initial Address Message (IAM) that is forwarded through the CCS network to the call control node 70 (step 65), to the first instance 70a of the call control node 70. The IXC ID is a routing number that is used to force calls to CC1 onto the E-ISUP trunk group 18. The IXC ID is translated by the SSP 30 using routing tables well known in the art. The translation yields the trunk to be used for routing the call. The trunk identification code and the circuit identification code (CIC) of the selected trunk are included in the IAM, in this case the trunk is in the E-ISUP trunk group 18, which is provisioned so that the call control node 70 is a virtual SSP 70a between opposite ends of the trunk. The IAM may contain the IXC ID, the DN and either the CLID or charge number details.

As noted above, for the sake of illustration the SSP 30 performs the function of at least two switches. A tandem is required to generate the billing record and direct the IAM to the specified IXC ID. As is well known, a tandem switch does not normally serve subscriber lines. FIGS. 2A–C are therefore a simplification to save space and render explicit the signaling that most directly constitutes the invention.

When the IAM is received at the call control node 70, a call identification (ID) request is generated based on the details contained in IAM and sent to the call control application server 90 in a TCP/IP message, for example, (step 85). In response to the call ID request, the call control application server 90 queries ISCP 60 for additional information regarding the pending call request, using, for example, another TCP/IP message (step 95). In particular, the information requested includes a translation of the dialed digits required to forward the call through the PSTN to the CC1. A reply to the query, is received (step 105) from the ISCP 60, and processed by the call control application server 90. The call control application server 90 sends a conversion number, obtained from the ISCP 60, to the call control node 70 (step 112), in response to the request for a call ID. The call control application server may also provide charge number information, CLID/ANI, DN, billing flags, application flags or other call ID details are returned to the call control node 70 (step 112).

Using the conversion number, call control node 70 advises SSP 80 of the call incoming on the other end of E-ISUP trunk 18 (step 115). As is known in the art, the information contained in the IAM sent in step 115 is translated by SSP 80 to determine a next leg of the routing path over the PSTN. The translation tables at SSP 80 force the SSP 80 to reserve an available trunk of the trunk group 24 to which the monitoring device 200 is connected (step 125), and formulates an IAM, containing the CIC of the reserved trunk, which is forwarded to the call control node 70 because it is a virtual SSP 70b (FIG. 1) located between terminating ends of the trunk group 24. The call control node 70 translates the conversion number and forwards the IAM to the next SSP (not shown) in the PSTN (step 135), which terminates the E-ISUP trunk group 24. Thereafter, a connection to CC1 is set up through the PSTN in a manner known in the art.

In addition, the call control node 70 formulates and sends a TCP/IP message, in step 140, to the call control application server 90, notifying the call control application server 90 of the CIC of the E-ISUP trunk group 24 selected to carry the call between SSP 80 and the PSTN 100. On receipt of this message the call control application server 90, having already determined that the pending call requires monitoring device activation in light of the TCAP Response message received in step 105, instructs the monitoring device 200 (step 145) to begin monitoring the designated CIC of E-ISUP trunk group 24.

The final step in the reservation of a trunk connection between the calling party and the recipient of the call is for the CC1 to apply ringing to a telephone 82 (step 165) of an agent selected to handle the call. An Address Complete Message (ACM) is then returned switch by switch through the PSTN 100, to inform each switch that the call setup is complete. The ACM is relayed from the PSTN 100 to the call control node 70, as virtual SSP 70b, in E-ISUP 2 trunk group 24 (step 166), from the call control node 70 to the SSP 80 (step 168), from the SSP 80 to the call control node 70, as virtual switching point 70a in E-ISUP trunk group 18 (step 170), and from there to SSP 30 (step 172). The ringing is heard by the calling party (step 174). When the called agent's telephone is answered (step 175), an answer message (ANM) is relayed to the switches in sequence (steps 176–182), and the conversation between the called party and the agent can begin (step 184). In step 183, an IP message is sent from call control node 70 to call control application server 90 informing the latter that a call through the monitored trunk 24 is completed. This prompts the call control application server 90 to open a first billing record for the call, which indicates that the charge is to the 1-8XX DN.

Throughout the duration of a conversation between the calling party and the call center agent, the monitoring device 200 monitors the trunk in ISUP trunk group 24 for predetermined service request and service control information generated by the called enter agent. Since only a CC1-to-calling party side of the trunk is monitored, unintentional triggering of a service feature by the calling party is avoided. The call center agent is therefore enabled to directly control the call and may invoke any service feature supported by the call control application server 90. Exemplary services include call transfer and call conferencing, for example. Any audible signal that is distinctive can be used to invoke a service, such as dual-tone-multi-frequency (DTMF) signals generated from a dial pad by the call center agent's phone, or voice commands.

As illustrated in FIG. 2B, during the conversation between the calling party and the call center agent, a control code, for example DTMF tones generated by the call center agent, are detected by the monitoring device 200 (step 190). The code is sent through the Intranet 250 to the call control application server 90 (step 192).

In response to the received control code, the call control application server 90 analyzes the code (step 195), to determine actions to be taken, and forwards directives with relevant call control information to the call control node 70 (step 196) and the monitoring device 200 (step 197). In step 197 the monitoring device receives a message directing it to cease listening to the E-ISUP trunk 24. As a result of the directives of step 196, the call control node 70 begins taking down the trunk connection between the calling party and the CC1 with an ISUP Release (REL) message, issued from its function as a virtual SSP 70a in E-ISUP trunk group 18, by issuing the REL message to the SSP 80 (step 198). Each REL message received by a switch is compulsorily acknowledged with a release complete (RLC) message: in step 205, SSP 80 returns a RLC message to the call control node 70. The REL message is forwarded by the SSP 80 to the call control node 70 in the E-ISUP 2 trunk (step 207). This REL is also acknowledged (step 210), and the REL message is further relayed to the PSTN by the call control node 70. Before this REL message is acknowledged in step 216, dial tone is applied to the telephone of the call center agent (step 218).

Meanwhile, the call control node 70 formulates an IAM using a routing number supplied by the call control application server 90 in the transfer call instruction (step 198). The routing number is used to force the SSP 80 to route the call onto an available trunk of the E-ISUP trunk group 22, in the same way as described above. The SSP 80 forwards the IAM, per its translation of the routing number supplied by the call control application server 70 (step 225). As a result, an available trunk is reserved for the call in the E-ISUP trunk group 22, and the reserved circuit identification code is included in the IAM which is forwarded through the CCS network to the call control node 70, which is likewise a virtual SSP 70c between terminating ends of the E-ISUP trunk group 22 (step 235). The call control node 70 receives this IAM with the routing number, recognizes that it is a call that requires an ID, and that the ID was provided by the call control application server in step 196. The call control node 70 therefore replaces the routing number with a directory number (DN). The DN may have been keyed in by the recipient or retrieved by the call control application server 90 from a speed-dial table, or the like, using a code input by the call center agent in step 190., The call control node 70 then forwards the IAM to the PSTN (step 240). The IAM progresses through the PSTN to CC2, which applies ringing to a telephone 92 of a second call center agent selected to handle the call (step 245). ACM messages are formulated and relayed back to the call control node 70, as a virtual SSP 70c in E-ISUP trunk group 22 (step 246), the SSP 80 (step 248), and the call control node 70, as a virtual S3P 70a in E-ISUP trunk group 18 (step 252). Switches in the PSTN are expected to reflexively forward ACM, REL and ANM messages to the next SSP in the call path that it serves to complete. In this case, however, the trunk path between the calling party and the E-ISUP trunk is still active, so the call control node 70, as virtual SSP 70a in E-ISUP trunk group 18, must discard the ACM (step 254) rather than forwarding it to the SSP 30. Once the agent at CC2 answers telephone 92 (step 255), illustrated in FIG. 2C, ANM messages are likewise formulated and relayed back through the same SSPs (steps 260–265), the ANM is likewise discarded by the call control node 70 (step 268) instead of being relayed to SSP 30. In step 261, a call complete message is sent from the call control node 70 notifying the call control application server 90 that the call has been successfully transferred from CC1 to CC2. This message prompts the call control application server 90 to open a second billing record to track the second phase of the call.

The call control node 70 then formulates an IP message to advise the call control application server 90 that the transfer of the call from CC1 to CC2 is complete (step 270). The call control application server 90 may send an IP message to the workstation 84 of the agent in CC1, indicating that the call was successfully transferred (step 275). Conversation between the calling party and the agent at CC2 ensues (step 280).

If the transfer had not been completed within a predefined length of time, the call control application server 90 may be provisioned to release any call path that was created, and either reinitiate a connection to CC1, or terminate the call. The E-ISUP trunk group 22 may also be monitored by a monitoring device, and may also be served by the call control application server 90, and the same call control node 70.

In providing the service features of the present invention, billing records are generated to track the usage of the system. As is practiced in the art, billing records are usually generated at the originating SSP, in this case SSP 30. However, since the present invention provides the ability to transfer a call to a second call center or customer, the first billing record would be inaccurate, because the SSP 30 is unaware of the transfer or the progress of the call. Accordingly, the present invention further provides a tracking mechanism to record the call connections, as well as all features invoked while the call is served by the intelligent switched telephone network. The call control application server 90 is the component of the present invention responsible for controlling call connections and routing. That is, the call control application server 90 receives the bearer signaling detected by the monitoring device, interprets this signaling to determine a next termination for a call, and instructs the call control node 70 to effect the establishment of the call. As a result, the call control application server 90 is responsible for recording and managing the call service features or network resources utilized by a given customer. Each time bearer signaling is retrieved from a trunk by the monitoring device 200, a corresponding billing code is preferably generated by the call control application server 90. Therefore, the level of each customer's activity is recorded for the purpose of billing by the call control application server 90.

As exemplified in FIGS. 3A–D, the present invention may also be used to effect consult and conference call features. In particular, service request information may be captured by the monitoring device 200 from a bearer channel (an E-ISUP trunk 24, as illustrated in FIG. 1, for example). In the example shown in FIGS. 3A–D, a call center agent at CC1 may wish to consult with a second call center agent at the associated CC2 at some point during a call with a calling party. If the call in progress (shown at 305) has been set up through the E-ISUP 24 to which the monitoring device 200 is connected, the first agent can effect a desired feature by inputting an appropriate control code, via DTMF tones or a voice command, to request a consultation with the second call center agent (step 310). The control code is extracted from the bearer channel of E-ISUP trunk group 24 by the monitoring device 200 and passed to the call control application server 90 (step 315). The call control application server 90 analyzes the control code (step 320) and instructs call control node 70 to release a center portion of the call, and to reconnect the calling party to a voice access server (VAS) 110 until further instructions are received. To begin the procedure, the call control node 70 issues an ISUP REL message from its function as the virtual SSP 70*a* in E-ISUP trunk group 18, to release the call through SSP 80, but controls the release from its function as the virtual SSP 70*b* in E-ISUP trunk group 24, to prevent the first agent from being released. Once the call is released, in accordance with procedures described above and illustrated in steps 330–350, the call control node 70 sends an ISUP IAM to SSP 80 to connect the calling party to the VAS 110. The ISUP-IAM message contains the CIC of the call to be terminated at the VAS and a DN of the VAS (step 355). The DN is translated at the SSP 80 (step 360) and an ISDN connect request is sent to the VAS (step 365). In response, the VAS 110 returns an ISDN-ACK message to the SSP 80 (step 370) which, in turn, formulates an ISUP-ACM message that is sent to call control node 70 (step 375). The ACM is not relayed on to SSP 30, but is discarded by the call control node (step 378). The VAS 110 issues an ISDN answer message (step 380) to SSP 80 when the VAS has answered the call request. The SSP 80 responds by formulating an ANM, and issues the ISUP ANM to call control node 70, instance 70*a* (step 385). As it did with the ACM, the call control node 70 discards the ANM, in step 388. After discarding the ANM, call control node 70 sends a message through the Intranet to the call control application server 90 (step 390) informing the call control application server 90 that the release and reconnect of the calling party has been completed. A hold announcement is played to the caller by the VAS 110 (step 400) after the ANM is issued in step 385.

Figure 3B:
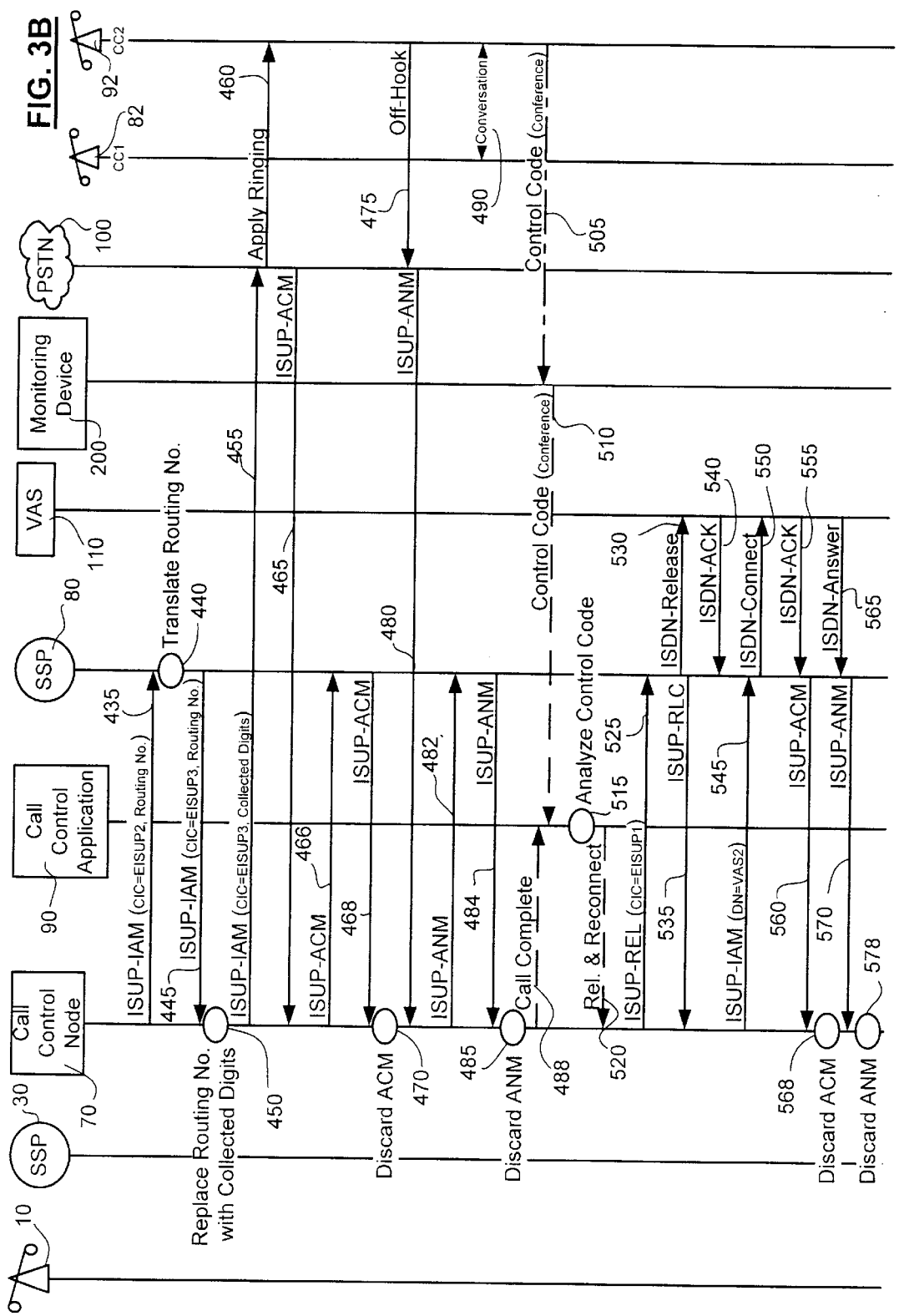

Meanwhile, the CC1 agent inputs a DN (or a code representing a DN) of the CC2 agent by, for example, dialing digits that are conveyed as DTMF signals, over the monitored bearer channel (step 410). The monitoring device 200 extracts (step 415) the DTMF call control information and forwards the digits to the call control application server 90 (step 420). Call control application server 90 receives and translates the digits (step 425), and instructs the call control node 70 to establish a connection between the CC1 agent and the CC2 (step 430). The call control node responds, as shown in FIG. 3B by formulating an ISUP IAM that includes a CIC of E-ISUP 2 (a channel in E-ISUP trunk group 24) and a routing number that forces SSP 80 to route the call to the E-ISUP trunk group 22. The ISUP IAM is sent with the point code of the call control node 70 in its function as virtual switching point located between terminating ends of the E-ISUP trunk group 24, the CIC=E-ISUP 2 being the bearer channel to which telephone 82 of CC1 agent is connected. The ISUP IAM is sent through the CCS network to the SSP 80 (step 435). The SSP 80 translates the routing number (step 440) to determine the trunk to which the IAM is to be forwarded. Thus, SSP 80 forwards an IAM to the call control node 70 (step 445) which is a virtual SSP 70*c* between terminating ends of E-ISUP trunk group 22. The call control node 70 replaces the routing number with the DN (step 450) in an IAM it forwards to an SSP in the PSTN that terminates the E-ISUP trunk group 22. The remainder of the bearer path between the CC1 agent and the CC2 agent is established to CC2 92 (step 455). Accordingly, in response to an ISUP-IAM ringing is applied to the CC2 agent's telephone 92 (step 460). As described above, an ISUP-ACM is returned through the PSTN to call control node 70 in its function as a virtual SSP 70*c* in E-ISUP trunk group 22 (step 465). The call control node modifies the ACM and forwards it to SSP 80 (step 466), which forwards the ACM to call control node 70 in its function as a virtual SSP 70*b* in E-ISUP trunk group 24 (step 468). The call control node 70 receives the ISUP-ACM and discards it (step 470). When the call is answered in step 475, ISUP-ANMs cascade back from CC2 to call control application server 90 in its function as a virtual SSP 70*c* E-ISU2 trunk group 22 (steps 480–484), just as ACMs progressed through the CCS network in steps 465–468. The ISUP-ANM is also discarded by the call control node 70 in its function as a virtual SSP 70*b* in E-ISUP trunk group 24 (step 485). The call control node 70 then issues an IP message informing the call control application server 90 that the call is complete, so that the call control application server 90 can open a second billing record for the consult service portion of the call. A call connection is thus established between the telephone 81 of the CC1 agent and the telephone 92 of the CC2 agent, at step 490, for the purpose of enabling consultation between the CC1 agent and the CC2 agent, while the calling party remains on-hold at the VAS 110.

When the consultation between the CC1 agent and the CC2 agent is complete, the CC1 agent decides to join the calling party to the session. This is performed using a conference call service feature. The CC1 agent inputs the call control information (control code) to initiate the conference call (step 505). The monitoring device 200 detects the control code and relays it to the call control application server 90 (step 510). Call control application server 90 analyzes the control code (step 515) and sends a release and reconnect message to call control node 70 (step 520). The release and reconnect message specifies the trunk carrying the calling party on-hold at the VAS 110. An ISUP-REL message specifying the trunk (E-ISUP 1) that connects the calling party to the VAS 110 is sent to the SSP 80 (step 525), and a corresponding ISDN release message is sent from the SSP 80 to the VAS 110 (step 530). An ISUP-RLC message is returned to the call control node 70 in its function as the virtual SSP 70*a* in E-ISUP trunk group 18 from SSP 80 (step 535) and an ISDN Acknowledge message is sent from VAS 110, signaling the release of the connection to the VAS 110

(step 540). The call control node 70, having received the RLC message in step 535, sends an ISUP-IAM to SSP 80 containing a DN corresponding to a conference bridge at VAS 110 (step 545). An ISDN Connect message is then sent from SSP 80 to VAS 110 to effect the connection of the calling party 10 to the conference bridge (step 550). An ISDN Connect Acknowledge message is issued to SSP 80 (step 555), which relays an ISUP-ACM to call control node 70 (step 560). The call control node 70 discards the ACM (step 568). The VAS 110 answers the call and issues an ISDN Answer message to SSP 80, in step 565. The SSP 80 sends an ISUP-ANM to call control node 70 in E-ISUP 1 (step 570), which discards the ANM (step 578). The calling party is now connected to the VAS conference bridge.

As illustrated in FIG. 3C, the call control node 70 releases the CC2 agent and CC1 agent, and respectively reconnects them to the conference bridge at VAS 110. In steps 580–598, the connection between the call control node 70 in its function as the virtual SSP 70b in E-ISUP trunk group 24, and the call control node 70 in its function as the virtual SSP 70c in E-ISUP trunk group 22 is released. This involves the exchange of ISUP REL and RLC messages between the call control node 70 in E-ISUP trunk group 24 and SSP 80 (steps 580, 585), and between the SSP 80 and the call control node 70c in E-ISUP trunk group 22 (steps 590, 595). In step 598, the REL message is discarded by call control node 70c in E-ISUP trunk group 22. A call release notification is sent to the call control application server 90 from the call control node 70 in step 596, which prompts the call control application server 90 to complete the second billing record.

Steps 600–630 are steps required to connect the CC1 agent to the conference bridge, and steps 635–670 are similar steps required to connect CC2 agent to the conference bridge. Only the first sequence of setups is described. In step 600, call control node 70 in its function as the virtual SSP 70b in E-ISUP trunk group 24 formulates and issues an IAM, with a DN of the conference bridge of the VAS 110 to which the calling party is connected. The SSP 80 receives the IAM and, upon translation, sends an ISDN connect message to the conference bridge of the VAS 110. The connect message is acknowledged with an ISDN ACK message (step 610); the SSP 80 issues an ISUP-ACM to the call control node 70 (virtual SSP 70b) in E-ISUP trunk group 24 (step 615); and the ACM is discarded (step 622). When the CC1 agent is connected to the conference bridge, an ISDN answer message is generated, and returned to the SSP 80 (step 620). The SSP 80 then sends an ISUP-ANM to the call control node 70 (virtual SSP 70b) (step 625), completing the connection (step 630). The ANM is discarded by the call control node 70 in step 626.

The directly analogous steps involved in extending the connection to the CC2 agent to the conference bridge of the VAS 110 are performed in steps 635–670, and after step 670 all three parties to the call are connected to the conference call. In step 628, the call control application server 90 is informed of the completion of the conference call and opens a third billing record accordingly. In step 666, a similar message is issued and the third billing record is updated to track the usage of the CC2 agent.

In the example shown in FIG. 3C, the CC1 agent leaves the conference call by hanging up (step 700). An ISUP-REL is generated at CC1 and relayed through the PSTN 100 to the call control node 70 in its function as the virtual SSP 70b in E-ISUP trunk group 24 (step 710). An ISUP-RLC message is subsequently returned by the call control node 70 to the switch from which the REL was issued (step 720). In addition, an ISUP-REL message is sent from the call control node 70 to the SSP 80 releasing the trunk in E-ISUP trunk group 24, in step 725. The SSP 80 acknowledges the REL with an ISUP-RLC message (step 730), releases the trunk in E-ISUP trunk group 24, and sends an ISDN release message to VAS 110 requesting the release of the ISDN line carrying the connection to the CC1 agent (step 735). As Illustrated in FIG. 3D, the VAS 110 releases the ISDN line (step 740) and sends an ISDN-RLC message to SSP 80 (step 745). As a result, the agent at CC1 is disconnected from the conference call, leaving the calling party and the CC2 agent in a conference connection at VAS 110 (step 748). In step 738, the call control application server 90 is notified by the call control node 70 of the release of the trunk path used by the CC1agent and, accordingly, completes one portion of the third billing record.

A release sequence of the conference call is shown in steps 750–820. For the sake of illustration, it is assumed that the telephone of the CC2 agent goes on-hook first (step 750). As discussed above, an ISUP-REL message is automatically generated at the CC2 and relayed through the PSTN 100, with mandatory ISUP-RLC messages returned at every step. The REL is received by the call control node 70 in its function as the virtual SSP 70c in E-ISUP trunk group 22 (step 755). Subsequently, call control node 70 returns an ISUP-RLC message (step 760), and sends an ISUP-REL message to SSP 80, requesting the release of the E-ISUP 3 trunk (step 765). The SSP 80 returns an ISUP-RLC message (step 770) and sends an ISDN release message to VAS 110, requesting release of the ISDN line carrying the connection to call center 92 (step 775). The call control node 70 in E-ISUP 3 trunk receives the RLC message from SSP 80 and sends an IP message to the call control application server 90, which completes the first and third billing records. VAS 110 proceeds to release the ISDN line connected to the CC2 agent (step 780), and sends an ISDN Release Acknowledgement message to SSP 80 (step 785). All call connections are now released between the VAS 110 and the CC2 agent.

A similar cascade of REL, RLC and ISDN Release messages are used to release the calling party when the CC2agent goes on-hook (steps 790–820), thereby completing the release of all resources connected to the call.

It will be noted that separate billing records are preferably generated for each service feature requested. This separation of billing records permits billing according to use, and the call control application's ability to perform centralized billing record management is an advantage of the invention.

The invention provides a convenient and effective system and method for controlling the progress of an established call. In particular, the ability of the monitoring device 200, connected directly to a designated bearer channel, to capture service request and call control information for controlling a call's progress, is advantageous. A telephone service subscriber, can quickly and conveniently initiate a call control feature and PSTN resources are used efficiently, without duplication of call paths or redundant use of resources.

Although the invention has been described above with particular reference to transfer, consult and conference features, it should be understood that the invention has much broader application and can be used to implement many other service features in the PSTN. Furthermore, although the invention has been described with particular reference to calling centers and call control by call center agents, it should be understood that the invention may be adapted for use in service application and the uses are in no way limited to call center service applications.

The embodiment(s) of the invention described above is(are) intended to be exemplary only. The scope of the invention is therefore intended to be limited solely by the scope of the appended claims.

We claim:

1. A system for providing service features in a telecommunications network, comprising:
   a bearer channel monitor adapted to capture service feature control information sent through a bearer channel in the telecommunications network by a party to a telecommunications session set up between at least two parties using the bearer channel; and
   a call control application server for receiving the service control information and effecting service features in response to the service control information.

2. A system as claimed in claim 1 further comprising a call control node that receives instructions from the call control application server, and sets up or tears down connections through the telecommunications network in response to the instructions.

3. A system as claimed in claim 2 wherein the call control node is a virtual a switching point in the telecommunications network.

4. A system as claimed in claim 3 wherein the telecommunications network is a switched telephone network and the virtual switching point is a virtual service switching point in the switched telephone network.

5. A system as claimed in claim 4 wherein the virtual switching point is provisioned with a plurality of virtual trunk groups, and serves as a virtual switching point between terminating ends of a plurality of physical trunk groups in the switched telephone network, each of the respective virtual trunk groups being associated with a one of the respective physical trunk groups.

6. A system as claimed in claim 5 further comprising a plurality of service switching points connected to opposite ends of the respective trunk groups, at least certain ones of the service switching points being provisioned to route calls to the trunk groups when the calls are associated with a predetermined routing code.

7. A system as claimed in claim 6 wherein the service switching points are further provisioned with routesets and linksets that direct common channel signaling messages associated with the calls to the call control node.

8. A system as claimed in claim 1 further comprising an intelligent peripheral used by the call control application server to effect certain ones of the service features.

9. A system as claimed in claim 8 wherein the intelligent peripheral is adapted ta perform the functions of an interactive voice response unit (IVR).

10. A system as claimed in claim 8 wherein the intelligent peripheral is adapted to perform the functions of a conference bridge.

11. A system as claimed in claim 1 further comprising a service control point (SCP) for providing dialed number translations to the call control application server.

12. A system as claimed in claim 11 wherein the SCP is an intelligent service control point (ISCP) and the call control application server queries the ISCP using messages sent through a data network.

13. A system as claimed in claim 1 further comprising a data network to which the bearer channel monitor and the call control application server are connected to permit an exchange of control commands and the service control information between the bearer channel monitor and the call control application server.

14. A method of enabling the provision of dynamic service features in a switched telecommunications network, comprising steps of:
   a) monitoring a bearer channel of a selected communications session set up through the switched telecommunications network between at least two parties, to capture service feature control information input by a one of the parties to the telecommunications session;
   b) analyzing the captured service feature control information to determine a service feature requested by the one of the parties to the telecommunications session; and
   c) controlling switching equipment in the switched telecommunications network to effect the service feature.

15. A method as claimed in claim 14 wherein the step of monitoring comprises a step of capturing content on the bearer channel and transferring the content to the call control application server.

16. A method as claimed in claim 14 wherein the step of analyzing comprises a step of analyzing the content at the call control application server to determine whether service control information has been captured.

17. A method as claimed in claim 15 wherein the step of analyzing comprises a step of parsing the content to detect discrete tone signals generated by the party using a telephone keypad.

18. A method as claimed in claim 15 wherein the step of analyzing comprises a step of parsing the content using a speech recognition algorithm to detect commands spoken by the party.

19. A method as claimed in claim 14 wherein the step of controlling switching equipment in the switched telephone network comprises steps of:
   a) sending instructions from the call control application server to a call control node that is a physical node in a control signaling plane of the switched telecommunications network, and a virtual node in a switching plane of the switched telecommunications network; and
   b) executing the instructions at the call control node to effect the service feature.

20. A method as claimed in claim 15 wherein the switched telecommunications network is a switched telephone network, and the step of executing the instructions comprises steps of:
   a) sending a release message forward through the switched telephone network from a first instance of the call control node, and discarding the release message at a second instance of the call control node to release a portion of a connection between a first and second party to the telecommunications session without releasing either of the first and second parties; and
   b) sending initial address messages (LAMs) from the respective first and second instances of the call control node to initiate a connection of the first and second parties to a new call termination.

21. The method as claimed in claim 20 further comprising a step of discarding subsequent common channel signaling messages related to the telecommunications session returned to the respective first and second instances of the cell control node.

22. The method as claimed in claim 20 wherein the service features include:
   a) transferring one of the parties to a new termination and releasing the other party;
   b) transferring one of the parties to a predetermined termination and connecting the other party with a new termination to permit the other party to consult with a person at the new termination; and
   c) dynamically conferencing two or more parties together.

23. The method as claimed in claim 22 further comprising a step of sending messages from the call control node to the call control application server to inform the call control application server of the status of the communications session each time a service feature is effected or a communications session is terminated.

24. The method as claimed in claim 23 further comprising a step of maintaining billing records at the call control node to track usage charges for each service feature invoked during a communications session.

25. A method as claimed in claim 24 further comprising producing a separate billing record at the call control application server for each service feature invoked during a communications session.

26. The method as claimed in claim 14 further comprising a step of provisioning the switched telecommunications network to route selected calls to bearer channels that are monitored to capture service feature control information.

27. The method as claimed in claim 26 wherein the switched telecommunications network is a switched telephone network, and the step of provisioning comprises steps of:
   a) provisioning a service control point (SCP) in the network to return a routing code in response to a common channel signaling query containing a directory number of a termination for the selected calls; and
   b) provisioning at least one service switching point (SSP) in the network to route the selected calls to selected trunks in the switched telephone network when art initial address message (LAM) containing the routing code is received.

28. The method as claimed in claim 27 wherein the provisioning further comprises a step of provisioning at least one trunk in the switched telephone network so that the call control node is a virtual switching point logically positioned between terminating ends of the at least one trunk.

29. The method as claimed in claim 28 wherein the step of provisioning the at least one trunk comprises a step of provisioning, at SSPs connected to opposite ends of the at least one trunk, routesets and linksets associated with the at least one trunk to route integrated Services Digital Network User Part (ISUP) common channel signaling messages associated with the selected calls to a specific instance of the call control node.

30. The method as claimed in claim 29 further comprising a step of provisioning the call control node with a plurality of virtual trunk groups, each virtual trunk group being associated with a physical trunk group in the switched telephone network.

* * * * *